No. 819,584. PATENTED MAY 1, 1906.
T. OLSEN.
TESTING MACHINE.
APPLICATION FILED NOV. 10, 1904.

4 SHEETS—SHEET 1.

No. 819,584. PATENTED MAY 1, 1906.
T. OLSEN.
TESTING MACHINE.
APPLICATION FILED NOV. 10, 1904.

4 SHEETS—SHEET 3.

Witnesses:
Hamilton D. Turner
Titus H. Irons

Inventor:
Tinius Olsen,
by his Attorneys
Howson & Howson

No. 819,584. PATENTED MAY 1, 1906.
T. OLSEN.
TESTING MACHINE.
APPLICATION FILED NOV. 10, 1904.
4 SHEETS—SHEET 4.
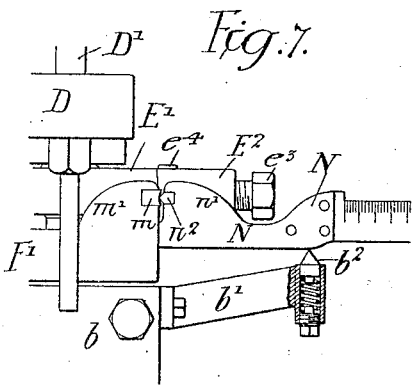
Fig. 7.
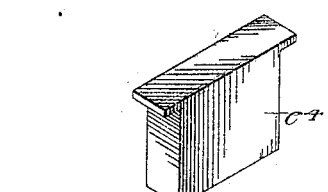
Fig. 10.
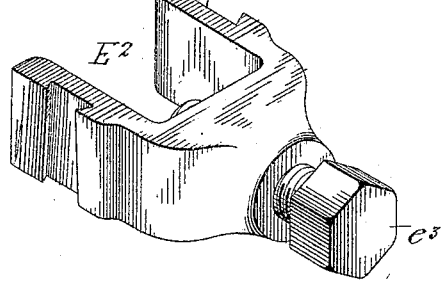
Fig. 9.
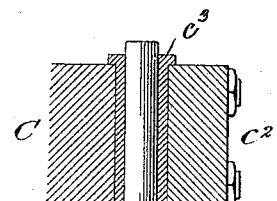
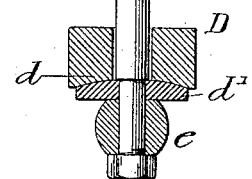
Fig. 11.
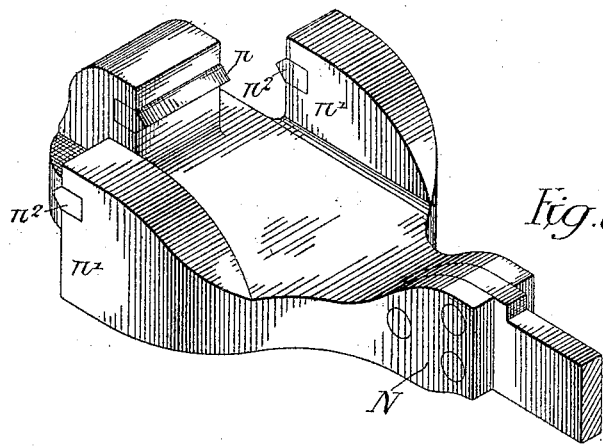
Fig. 8.
Witnesses:
Hamilton D. Turner
Titus N. Frous.
Inventor:
Tinius Olsen.
by his Attorneys,
Hinson & Hinson

UNITED STATES PATENT OFFICE.

TINIUS OLSEN, OF PHILADELPHIA, PENNSYLVANIA.

TESTING-MACHINE.

No. 819,584.  Specification of Letters Patent.  Patented May 1, 1906.

Application filed November 10, 1904. Serial No. 232,178.

*To all whom it may concern:*

Be it known that I, TINIUS OLSEN, a citizen of the United States, residing in Philadelphia, Pennsylvania, have invented certain Improvements in Testing-Machines, of which the following is a specification.

The main object of my invention is to provide means for placing a specimen under tension, at the same time subjecting it to vibratory or oscillatory motion. This object I attain by providing a testing-machine with means for applying stress to the free end of a specimen while the said end is subjected to vibratory or oscillatory motion.

A further object of the invention is to provide means for constantly maintaining stress on the specimen; and a still further object is to provide means for recording the distortion of the specimen and for the instant stoppage of the machine when the test specimen breaks.

Figure 1:
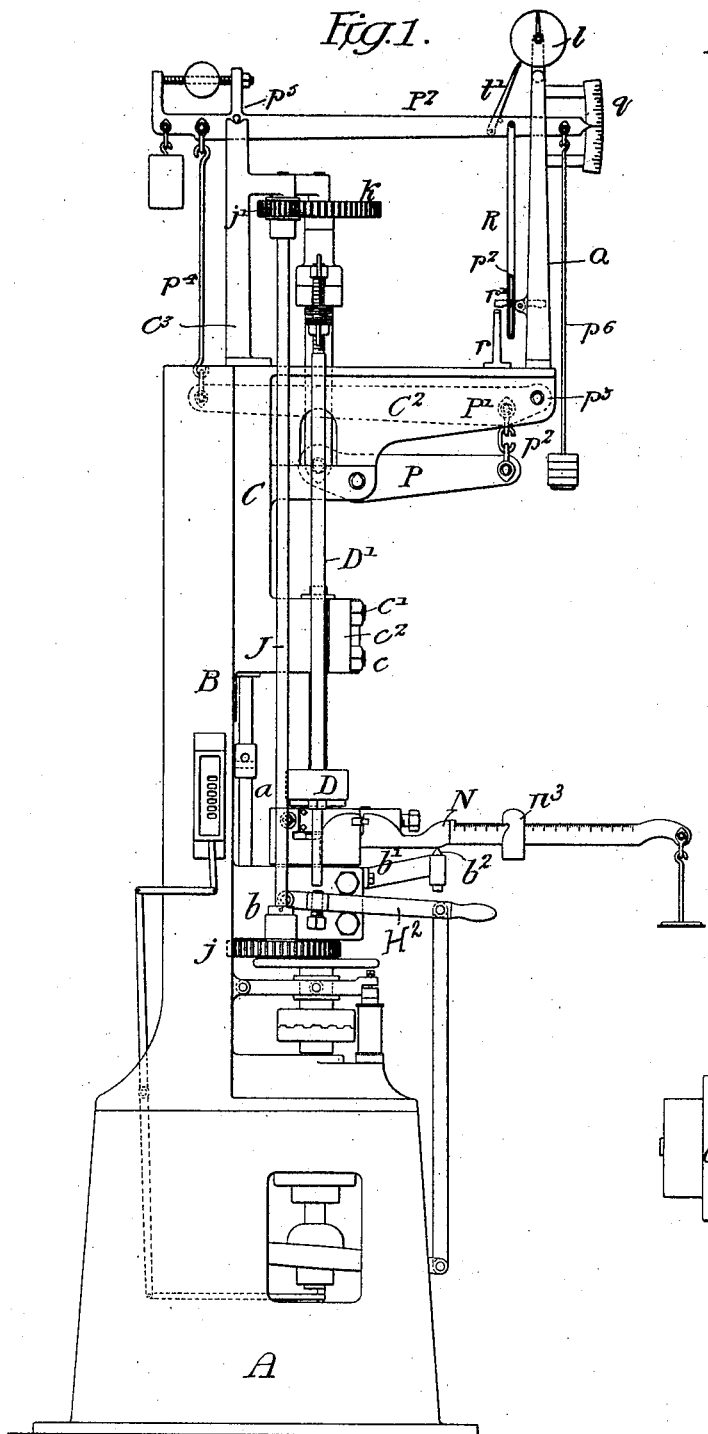
Figure 2:
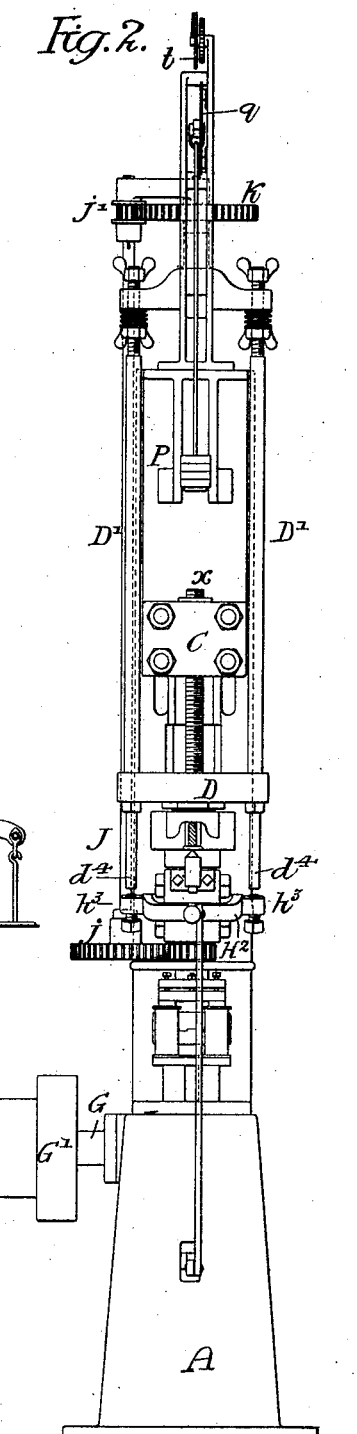
Figure 3:
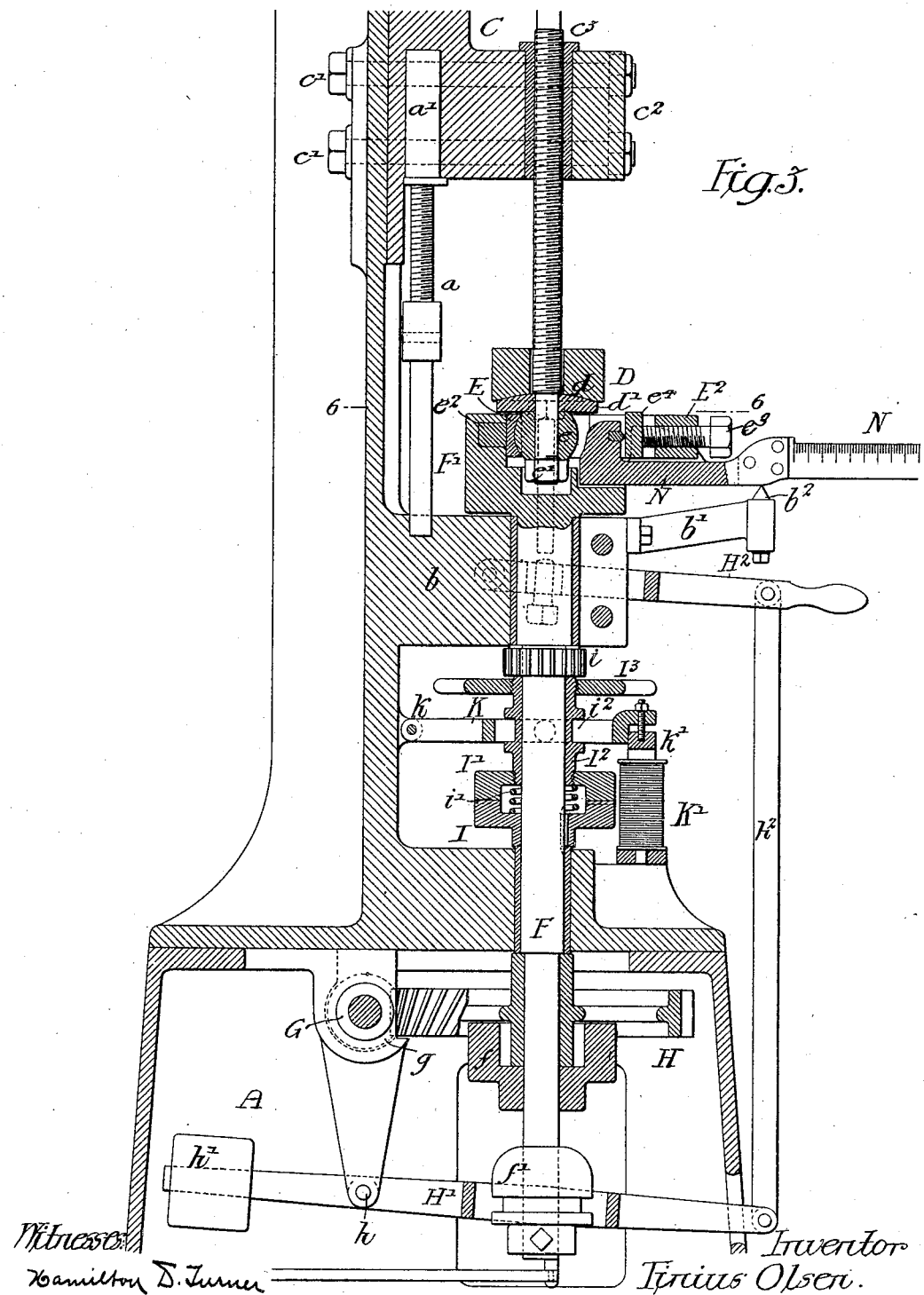
Figure 4:
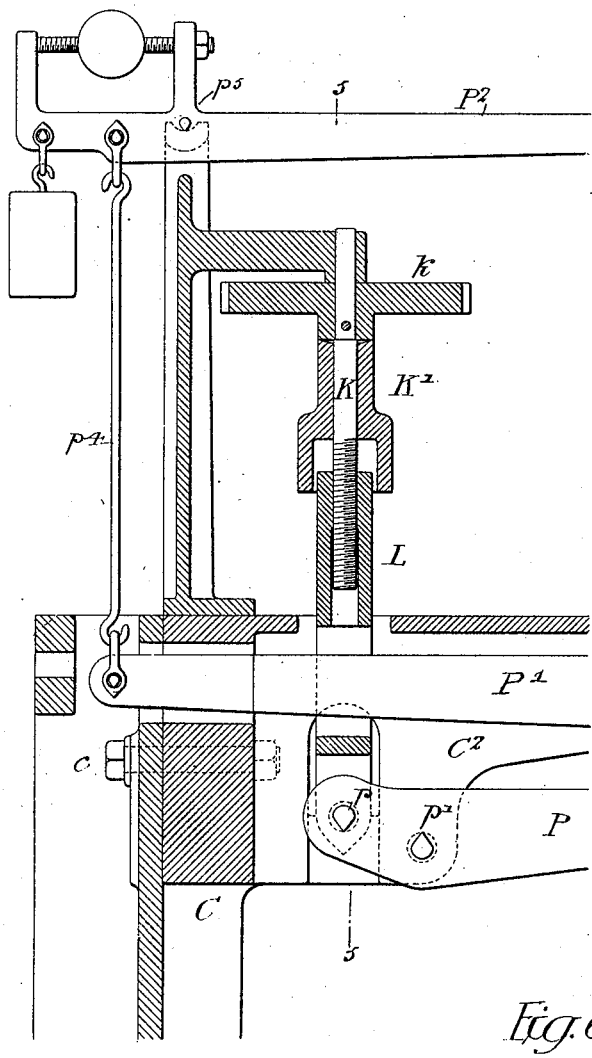
Figure 5:
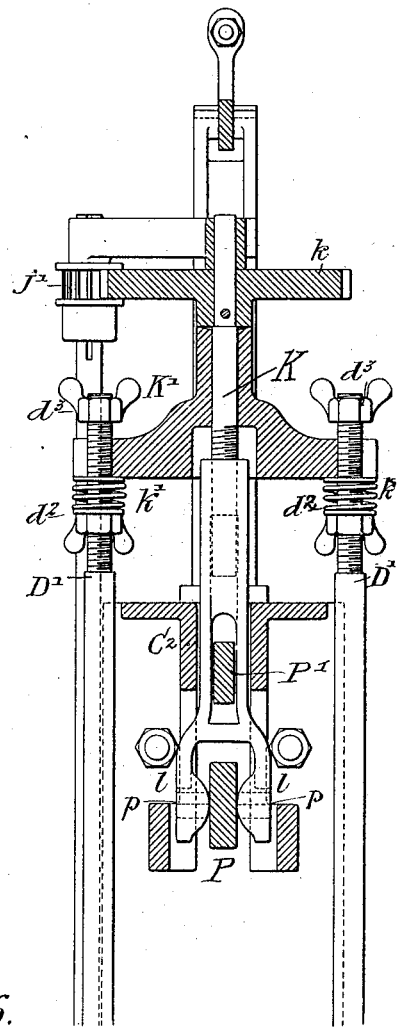
Figure 6:
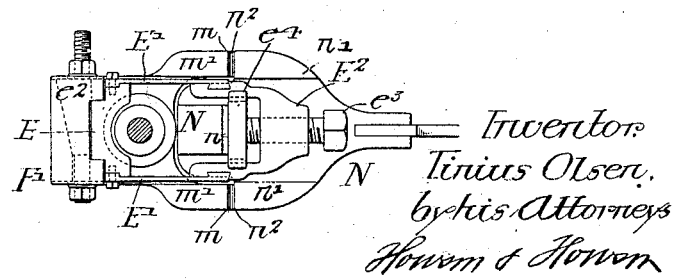

In the accompanying drawings, Figure 1 is a side elevation of my improved testing-machine. Fig. 2 is a front elevation. Fig. 3 is an enlarged sectional view of the lower half of the machine. Fig. 4 is a sectional view of a portion of the upper half of the machine. Fig. 5 is a sectional view on the line 5 5, Fig. 4. Fig. 6 is a transverse sectional view on the line 6 6, Fig. 3. Fig. 7 is an enlarged detail of a part of Fig. 1. Figs. 8, 9, and 10 are detached perspective views of parts of the machine, and Fig. 11 is a view of a different form of test specimen from that shown in Fig. 3.

A is the base of the machine, on which is mounted the standard B. Adjustably secured to the standard is a frame C. This frame is secured to the standard in the present instance by bolts $c\ c'$. The bolts $c'$ extend also through a clamp-plate $c^2$, which holds the test specimen $x$ rigidly to the frame C.

While the present machine can be used to test any specimen, it is designed particularly for testing stay-bolts for steam-boilers, which may be threaded throughout their entire length, as shown in Fig. 3, or the specimen may be made, as shown in Fig. 11, with a groove cut therein the depth of the screw-thread. Stay-bolts are not only subjected to tensile strains, but to vibratory strains as well, and this machine is designed to make the test to correspond with the strains to which the bolts are subjected.

I preferably provide a sleeve $c^3$, having a head which is clamped, by means of the clamp-plate $c^2$, to the frame, and this sleeve is threaded to mesh with the thread on the stay-bolt, so that the stay-bolt is held firmly to the frame when under tension.

In order to adjust the frame C, I provide an adjusting-screw $a$, one end of which is set in a projection $b$ of the standard B, while the other end is threaded and extends into a nut $a'$, mounted in a cavity in the frame C. By turning this screw $a$, the distance between the end of the frame C and the projection $b$ of the standard can be increased or diminished.

D is a cross-bar having a socket $d$ for the reception of a plate $d'$. This plate fits the test specimen, and the hole in the cross-bar D for the passage of the test specimen is of sufficient diameter to allow it to have a limited vibratory motion. Below the plate $d'$ is a ball $e$, flattened at top and bottom. The stem of the stay-bolt passes through the ball and is secured thereto by a nut $e'$. Bearing against this ball $e$ is a bearing-block E, which is carried by a head $F'$ on the upper end of a vertical shaft F. This block can be forced out against the ball by a wedge $e^2$, so as to throw the lower end of the stay-bolt out of the vertical line, and as motion is imparted to the shaft F and the block E travels around the stay-bolt it will cause the free end of the stay-bolt to have an oscillatory motion, while the opposite end is fixed, thus imitating to a degree the strains to which a stay-bolt is subjected when in a boiler.

In order to indicate the lateral strains upon a specimen, I attach two plates $E'$ to the block E, and these plates have parts which engage a U-shaped head $E^2$, having a set-screw $e^3$, carrying a hardened block $e^4$, against which rests a knife-edge $n$ of a beam N, which has graduations marked thereon and upon which slides a weight $n^3$. The beam has projecting portions $n'$ at each side, carrying knife-edges $n^2$, which rest in notches in hardened blocks $m$, carried by projections $m'$ of the head $F'$, so that the block E can be made to exert any desired lateral pressure upon the rod or blank to be tested by adjusting the weight upon the beam. After this has been done the wedge $e^2$ is set up, thereby being caused to exert a permanent strain on the rod equal to that applied by means of the weight on the beam, said beam being of course removed before the shaft F is set in motion.

Projecting from the bearing $b$ is an arm $b'$, which carries a spring-stop $b^2$, placed to arrest the downward movement of the beam N.

This stop serves to support the beam as long as there is no strain upon the test-piece, though when the machine is in action the beam is removed, as above noted.

The tension upon the specimen is supplied by downward pressure upon the cross-bar D, and, as remarked above, the oscillatory motion is given by rotation of the shaft F.

Mounted in the base A is the main driving-shaft G, which has a two-step pulley G'. On this shaft G is a spiral pinion $g$, which meshes with a spiral gear-wheel H, which runs idly on the vertical shaft F, and in order to throw this wheel H into gear with the said shaft I provide a clutch $f$, which can be actuated by a sleeve $f'$ in any suitable manner. The sleeve is arranged to slide on the lower end of the shaft F. This sleeve is acted upon by a weighted lever H', pivoted at $h$ to a bracket on the base A, and has a weight $h'$. The long arm of the lever is connected by a rod $h^2$ with a lever H², which is in the path of certain mechanism for automatically throwing the clutch out of action, as fully described hereinafter, it being understood that the weight $h$ is so adjusted upon the lever H' as to normally retain the lever H² in its raised or upper position.

Keyed to the shaft F is a clutch-disk I, having teeth on one face which are arranged to mesh with teeth on the clutch-disk I', which is secured to a sleeve I² loose on the shaft. Carried by this sleeve is a pinion $i$, which meshes with a gear-wheel $j$ on a vertical shaft J, extending to the upper portion of the machine. Secured to the sleeve is a hand-wheel I³, by which the sleeve can be turned by hand. A spring $i'$ is mounted between the two sections I I' of the clutch and tends to keep the sections out of engagement. When these sections are out of engagement, the cross-bar D is stationary, as it will be understood that motion is only imparted to the cross-bar D when the clutch-sections are in gear.

K is a lever pivoted at $k$ to the standard and has pins which enter the groove $i^2$ in the sleeve I², and carried by this lever K is an armature $k'$, and directly below the armature is a magnet K', which is energized when a certain contact is made, which will be described hereinafter, which causes the armature to be drawn down, and with it the lever and the sleeve, causing the clutch-disk I' to engage the clutch-disk I, so that the sleeve I² will turn with the shaft F, giving motion to the cross-bar D.

The mechanism for exerting a strain upon the bolt or specimen is as follows: The shaft J has a pinion $j'$ at its upper end which meshes with a gear-wheel $t^2$, secured to a screw-shaft T, and on the shaft is a cross-head T', through which pass vertical rods D', attached to the head D, which holds the lower end of the specimen. On these vertical rods D' are nuts $d^2$ and $d^3$, forming shoulders above and below the cross-head T', and mounted between the cross-head and the nuts $d^2$ are springs $t^3$. When the screw T is turned, it forces the cross-head T' down upon the shoulders $d^2$ of the vertical rods D', and this puts a compression on the said rods, the lower cross-head D, and the ball which is attached to the lower end of the specimen, the upper end of the specimen being held rigidly by the head C. The screw T is extended, and its screw-thread meshes with a thread on a clevis L, having openings at the forked end $l$ for the passage of the knife-edge pivots $p$ of a lever P, having knife-edge pivots $p'$, which rest in openings in the bracket C², projecting from the frame C. The lever P is connected with a second lever P' by links $p^2$. This lever P' is pivoted at $p^3$ to the bracket C², and the opposite end of this lever is connected by a rod $p^4$ to a beam P², pivoted at $p^5$ to a standard C³, carried by the frame C. This beam has the usual weight and the adjustable ball common to scale-beams and is pointed at the outer end and in line with a graduated segment $q$, carried by a standard Q on the outer end of the bracket C². From this end of the scale-beam P² is suspended a weighted rod $p^6$, upon which any number of weights can be mounted.

In order to stop the mechanism when the specimen breaks, the rods D' have extensions $d^4$, and on the lever H² are set-screws $h^3$, which are in line with the extensions of the rods, so that the moment the specimen breaks the springs $t^3$, which are mounted between the shoulders $d^2$ and the cross-head K', force the rods down, shifting the lever H² and the clutch-lever H', causing the clutch to be thrown out of gear with the shaft F.

In order to operate the clutch I', I connect the magnet K' in series with a current-generator and the two contact-points $r\ r'$, the contact-point $r$ being mounted on the bracket C², while the contact $r'$ is in the form of a lever pivoted to the standard Q. The said contact is normally out of engagement with the point $r$, and on the contact $r'$ is a pin which passes through the slot $r^2$ in the rod R, hung from the beam P², so that when the beam is at its lowest point the contact $r'$ will be forced down onto the contact $r$, so as to complete the circuit of the magnet K', which draws down the armature and the lever K, causing the clutch-disk I' to engage the clutch-disk I. The spring $i'$ tends to separate the clutches when the magnet K' is not energized.

The amount of load which shall be kept upon the specimen is predetermined by the number of weights on the rod $p^6$. The load is first applied by the hand-wheel, which is fastened to the sleeve I².

Mounted on the upper end of the standard Q is a recording-disk $t$, which is actuated by a pawl $t'$, carried by the beam P.

The operation of the mechanism is as follows: The stay-bolt or other specimen is clamped to the head C and is passed through the bar D and secured to the ball e in the manner clearly shown in the drawings. The block E is adjusted by the wedge $e^2$ to exert any desired lateral pressure on the ball e, the amount of such pressure being determined, if desired, by adjusting the weight on the scale-beam N preparatory to setting up said wedge. When the pressure is adjusted to the point desired, the scale-beam N is removed, so as to allow the head F' to turn. The clutch $f$ is then thrown into gear, so as to impart motion to the shaft F, and as the head F' rotates lateral strains are placed upon the specimen at the same time the tensile strain is placed upon the specimen by the cross-head T', and, as will be readily understood, when the piece under test has been elongated to a certain extent, so that the end of lever $P^2$ moves to the bottom of scale $q$, the electric mechanism is operated, thereby operating the clutch I and by driving-shaft J putting further tensional strain on the test-piece. As soon as the beam $P^2$ moves a certain distance upwardly the electric contact is broken, the clutch mechanism through which the cross-head is driven is thrown out of gear, and the cross-head D remains stationary until by the elongation of the test-piece caused by the permanent tension and the continued oscillatory stress the beam again reaches its lowest point, and the electric contacts are again brought into engagement. Thus the stay-bolt or other blank is subjected to lateral strains, as well as tensile strains. In the present instance the ratio between the movement at the stay-bolt and at the end of the pointer on the beam is one to five hundred. The arc is five inches long. Therefore if the stay-bolt stretched one one-hundredth of an inch the beam will fall from the top to the bottom of the arc. Then the adjustment will take place, and the beam will rise again. When it reaches the top, the small pawl engages a tooth of the recording-disk, moving it one notch. Thus the division on the disk represents the stretch of the stay-bolt in one one-hundredths of an inch. The arc is divided into ten parts. Each division, therefore, represents one one-thousandth-of-an-inch stretch of the stay-bolt. By observing the stretch as shown on this scale and the corresponding vibrations as given by the counter the number of vibrations required to produce the stretch of one one-thousandth of an inch in the stay-bolt may be obtained.

I claim as my invention—

1. The combination in a testing-machine, of means for holding one end of a specimen, a cross-bar and a plate through which the specimen extends, a ball to which the opposite end of the specimen is attached, a shaft, a head on the shaft, a block on one side of the head for acting against the ball when the shaft is turned so as to give the end of the specimen a gyrating motion, means for imparting tension to the specimen, and a scale-beam for indicating the amount of tension, substantially as described.

2. The combination in a testing-machine, of means for holding one end of a specimen, a cross-bar, and a ball to which the opposite end of the specimen is attached, a shaft, a head on the shaft, a block on one side of the head acting against the ball when the shaft is turned so as to give the end of the specimen a gyrating motion, means for imparting tension to the specimen, a scale-beam for indicating the amount of tension, a clutch through which the tension mechanism is actuated, and an electric device controlled by the scale-beam for throwing the clutch into action, substantially as described.

3. The combination in a testing-machine, of means for holding one end of a specimen, a ball attached to the opposite end of the specimen, a cross-bar mounted above the ball, rods attached to the cross-bar, a cross-head actuating said rods, a screw-shaft controlling the movement of the cross-head, a driven shaft, a head carried by the shaft, an eccentric block mounted on the head so as to give a gyrating motion to one end of the specimen, clutch mechanism between the said shaft and the operating mechanism for the cross-head, a lever, an armature on the lever, a magnet, a scale-beam, and contacts, one actuated by the scale-beam so that when the scale-beam is at a certain point it will make contact and energize the magnet, throwing the clutch into action to place tension upon the specimen, substantially as described.

4. The combination in a testing-machine, of a bracket, a bushing in the bracket to which the specimen is secured, a cross-bar through which the specimen passes, said cross-bar being concaved on its under side, a convex plate mounted under the cross-bar, a ball mounted under the plate, the specimen passing through the cross-bar, plate and ball, a nut on the end of the specimen bearing against the ball, a shaft having a head, and an adjustable block on the head bearing against the ball so that as the shaft is rotated a gyrating motion will be imparted to one end of the specimen, substantially as described.

5. The combination of a specimen rigidly secured at one end, a ball attached to the opposite end of the specimen, a cross-bar mounted above the ball, mechanism for applying pressure to the cross-bar for placing strain upon the specimen, a shaft, a head on the shaft, a block carried by the head bearing against the ball, and a wedge for adjusting the block, substantially as described.

6. The combination of a specimen rigidly secured at one end, a ball attached to the opposite end of the specimen, a cross-bar mounted above the ball, mechanism for imparting pressure upon the cross-bar for placing strain upon the specimen, a shaft, a head on the shaft, a block carried by the head bearing against the ball, and a wedge for adjusting the block, with a scale-beam hung to the head so that it can be readily removed, said scale-beam indicating the pressure of the block upon the ball, substantially as described.

7. The combination in a testing-machine, of means for rigidly attaching one end of a specimen, a ball secured to the opposite end of the specimen, a shaft, a head carried by the shaft, an adjustable block mounted on the head for causing a gyrating motion to the ball, arms on the head, a scale-beam having portions bearing against the arms and being provided with a projection, with means operatively connecting said projection and the block, substantially as described.

8. The combination in a testing-machine, of means for rigidly securing one end of a specimen, a ball carried by the other end of the specimen, a shaft, a head on the shaft, an adjustable block carried by the head and resting against one side of the ball, plates secured to the block, a head secured to the plates, a set-screw passing through the head, a scale-beam pivoted to the head and having a projection carrying a knife-edge, and a plate mounted between the knife-edge on the projection and the end of the set-screw, substantially as described.

9. The combination in a testing-machine, of means for holding a specimen in position, a shaft, means for imparting motion to the shaft, means carried by said shaft for giving a gyrating motion to one end of the specimen, a clutch-face on the shaft, a sleeve carrying another clutch-face, a pinion on the sleeve, a vertical shaft, a gear-wheel on the said vertical shaft with which the pinion meshes, a pinion on the opposite end of this shaft, a gear-wheel with which the said pinion meshes, a screw carrying the said gear-wheel, a cross-head on the screw, vertical rods passing through the cross-head, shoulders on the rods, a cross-bar engaging one end of the specimen, and means for throwing the clutch mechanism into gear, substantially as described.

10. The combination in a testing-machine, of means for rigidly securing one end of a specimen, a cross-bar attached to the other end of the specimen, means for imparting a gyrating motion to the said specimen, means for imparting tension to the specimen, a clutch interposed between a source of power and said strain-exerting mechanism, vertical rods engaging the cross-bar, and a lever to actuate the clutch having arms in line with the rods, so that when the said rods are depressed they will move the lever and throw the clutch out of action and stop the machine, substantially as described.

11. The combination in a testing-machine, of means for placing tensile strain upon the specimen, and means for gyrating one end of the specimen, a scale-beam, and means connecting the scale-beam with the specimen so that the tensile strain on the specimen will be indicated by the scale-beam, substantially as described.

12. The combination in a testing-machine, of means for rigidly securing one end of the specimen, means for gyrating the opposite end of the specimen, a cross-bar secured to said free end of the specimen, a scale-beam and a series of levers connected to the scale-beam, and mechanism mounted between the cross-bar and the said levers for imparting tensile strain to the specimen, substantially as described.

13. The combination in a testing-machine, of means for rigidly attaching one end of the specimen, mechanism for imparting a gyratory motion to the opposite end of the specimen, and a scale-beam connected to the said mechanism so as to indicate the lateral strain upon the specimen, substantially as described.

14. The combination in a testing-machine, of means for rigidly attaching one end of a specimen, and mechanism for moving the opposite end of the specimen laterally, with a detachable scale-beam connected to the mechanism for imparting a lateral motion to the specimen, substantially as described.

15. The combination in a testing-machine, of means for rigidly holding one end of a specimen, mechanism for imparting a gyratory motion to the opposite end of the specimen, mechanism for exerting a tensile strain upon the specimen, and means for indicating the amounts of the lateral and tensile strains exerted, substantially as described.

In testimony whereof I have signed my name to this specification in the presence of two subscribing witnesses.

TINIUS OLSEN.

Witnesses:
 WILL. A. BARR,
 JOS. H. KLEIN.